(12) United States Patent
Branch

(10) Patent No.: US 12,181,121 B1
(45) Date of Patent: Dec. 31, 2024

(54) AUTOMOBILE FUNERAL LIGHT

(71) Applicant: Bobbie Branch, Monrovia, MD (US)

(72) Inventor: Bobbie Branch, Monrovia, MD (US)

( * ) Notice: Subject to any disclaimer, the term of this patent is extended or adjusted under 35 U.S.C. 154(b) by 125 days.

(21) Appl. No.: 18/090,594

(22) Filed: Dec. 29, 2022

(51) Int. Cl.
| | |
|---|---|
| F21S 43/14 | (2018.01) |
| B60Q 1/00 | (2006.01) |
| B60Q 1/26 | (2006.01) |
| B60Q 1/46 | (2006.01) |
| F21S 43/19 | (2018.01) |
| H01M 10/0525 | (2010.01) |
| H02J 7/04 | (2006.01) |

(52) U.S. Cl.
CPC ............ *F21S 43/14* (2018.01); *B60Q 1/0029* (2013.01); *B60Q 1/2615* (2013.01); *B60Q 1/46* (2013.01); *F21S 43/195* (2018.01); *H01M 10/0525* (2013.01); *H02J 7/04* (2013.01)

(58) Field of Classification Search
CPC . B60Q 1/247; B60Q 1/32; B60Q 1/46; B60Q 1/508
See application file for complete search history.

(56) References Cited

U.S. PATENT DOCUMENTS

| | | | |
|---|---|---|---|
| 3,305,961 A | 2/1967 | Lanzon et al. | |
| 6,082,880 A | 7/2000 | Nerlino et al. | |
| 2011/0175719 A1* | 7/2011 | Ford | B60Q 1/2607 340/471 |
| 2014/0005860 A1* | 1/2014 | Chance | B60Q 1/2615 701/2 |
| 2015/0311747 A1* | 10/2015 | Chu | H05B 47/11 307/18 |
| 2017/0088047 A1* | 3/2017 | Parvaresh | B60Q 1/2615 |
| 2020/0361370 A1* | 11/2020 | Wescott | B60Q 5/006 |

* cited by examiner

*Primary Examiner* — Wei (Victor) Y Chan
(74) *Attorney, Agent, or Firm* — Sanchelima & Associates, P.A.; Jesus Sanchelima; Christian Sanchelima

(57) ABSTRACT

An automobile funeral light including a housing assembly, an electronic assembly, and an attaching assembly. Housing assembly includes a housing with a hollow body and a lid placed in a rear side thereof. Electronic assembly is housed inside the housing, having a plurality of LED strobes placed on the lateral sides, top side, and bottom sides of the housings, wherein the plurality of LED strobes is actuated wirelessly by means of an integral remote device and/or by means of a button placed on the housing. A rechargeable battery placed inside the housing powers the plurality of LED strobes. Attaching assembly includes a magnet, wherein the magnet is placed in a rear side of the housing and is used to be removably attachable to a vehicle, thereby the LED strobes provides warning visibility to oncoming traffic during a procession.

7 Claims, 3 Drawing Sheets

AUTOMOBILE FUNERAL LIGHT

II. BACKGROUND OF THE INVENTION

1. Field of the Invention

The present invention relates to funeral light and, more particularly, to an automobile funeral light that includes multicolor LED strobes removably attachable to the exterior of an automobile, wherein are actuated by a remote device, to indicate a funeral procession.

2. Description of the Related Art

Several designs for funeral lights have been designed in the past. None of them, however, include a housing with purple and white LED strobes actuated by a remote device, wherein the housing is removably attachable to the exterior of an automobile by means of a magnet, wherein the strobe LEDs are powered by a rechargeable battery.

Applicant believes that a related reference corresponds to U.S. Pat. No. 6,082,880 issued for an illuminated roof ornament attachment. Applicant believes that another related reference corresponds to U.S. Pat. No. 3,305,961 issued for portable illuminated signal flag. None of these references, however, teach of a portable, battery-powered, illuminated sign which is removably attachable to a vehicle using magnets, where the light has a strobe setting, purple and white lights, and is used for indicating a funeral procession.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to provide a special lighting for organizing a funeral procession.

It is another object of this invention to provide a device that prevents other vehicles from inadvertently cutting or interrupting the procession.

It is still another object of the present invention to provide a device that is portable and rechargeable and remotely actuated.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which.

Figure 3:
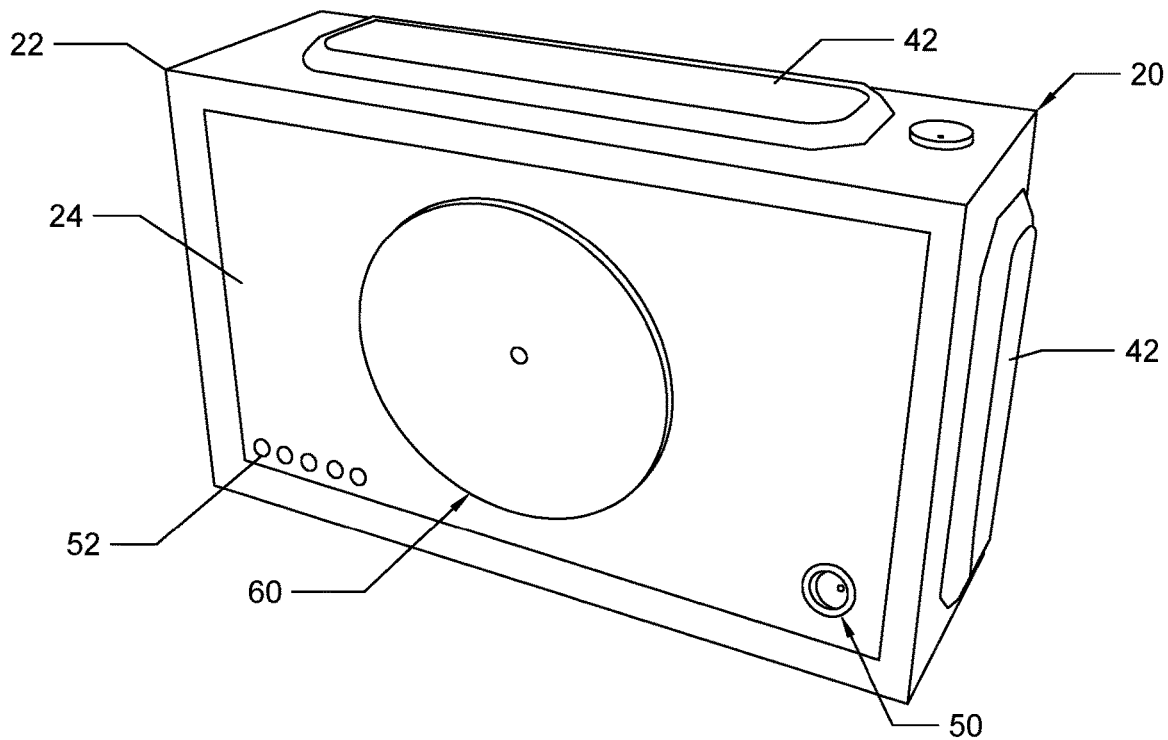

FIG. 3 illustrates a rear view of the housing assembly 20, wherein the magnet 62 is attached in a rear side thereof, and charge indicator 52 illustrates the charging status of the battery 54.

Figure 4:
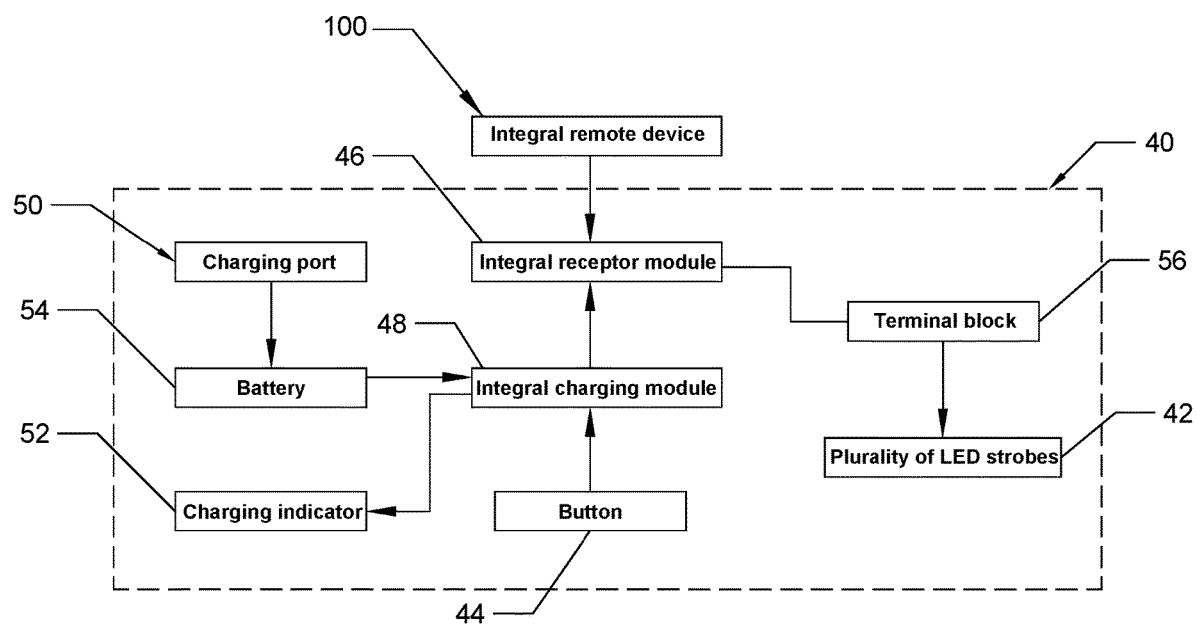

FIG. 4 is a representation of a diagram of the components electrically connected therebetween of the present invention 10.

V. DETAILED DESCRIPTION OF THE EMBODIMENTS OF THE INVENTION

Referring now to the drawings, where the present invention is generally referred to with numeral 10, it can be observed that it basically includes a housing assembly 20, an electronic assembly 40, an attaching assembly 60 and various exemplary embodiments (100) thereof. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Housing assembly 20 includes a housing 22 and a lid 24. In an exemplary embodiment, the housing 22 may have a cuboid shape. Nonetheless, it should be considered that the housing 22 may have an irregular shape. The housing 22 may have a hollow body. In a suitable embodiment, the housing 22 may include apertures on each side of its body, wherein the apertures may have a rectangular shape, a square shape, a circular shape, a regular shape, an irregular shape, or any other variation thereof. In a preferred embodiment, the housing 22 may be made of alloy steel, alloy aluminum, polyethylene, polypropylene, acrylic or any other suitable material. In other embodiment the lid 24 may be placed in a rear side of the housing 22, wherein the lid 24 may be removably attachable to the housing 22 by means of fasteners. Nevertheless, it should be considered that the lid 24 may be attached to the housing 22 by means of a hinge mechanism, a pull tab mechanism or any other mechanism known in the art. The lid 24 may have a smaller area than the rear side area of the housing 22. In a suitable embodiment, the lid 24 may have apertures in a portion thereof.

Figure 2:
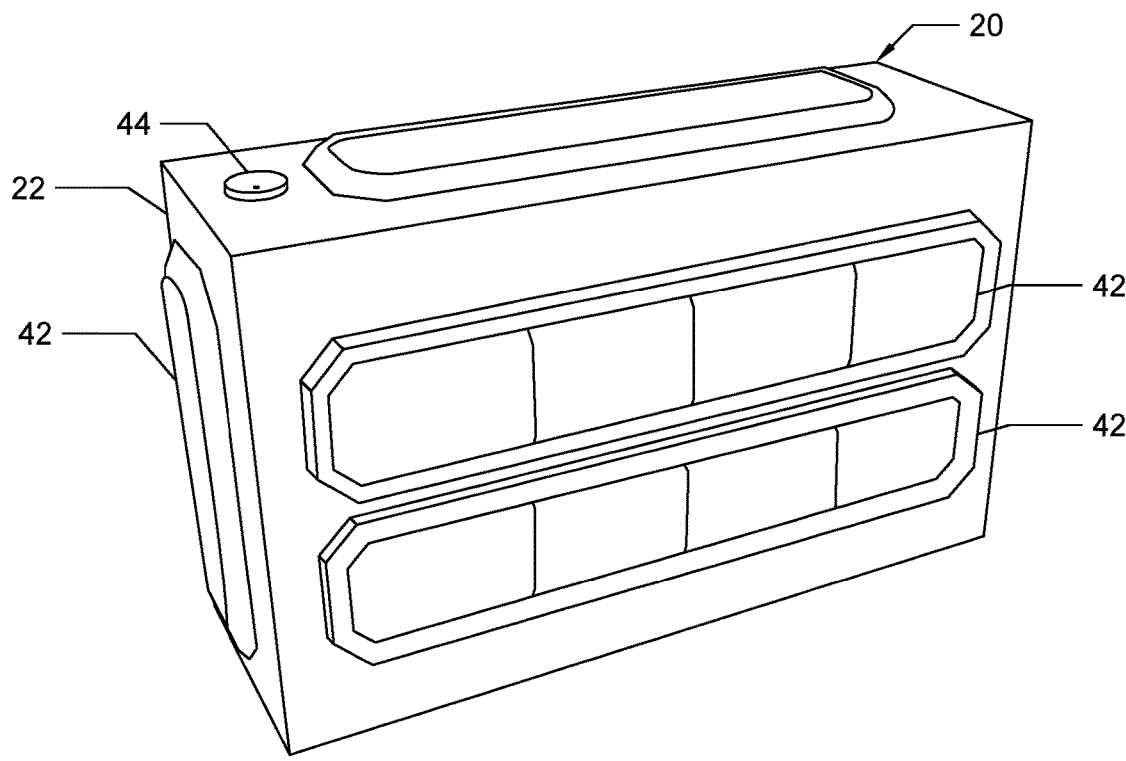
FIG. 2 shows an isometric view of the present invention 10.

Electronic assembly 40 includes a plurality of LED strobes 42, a button 44, an integral receptor module 46, an integral charging module 48, a charging port 50, a charging indicator 52, a battery 54, and a terminal block 56. In an exemplary embodiment, the plurality of LED 42 strobes may be housed inside the housing 22, wherein a portion of the plurality of LED strobes 42 extends past from the housing, thereby the light emitted by the plurality of LED strobes 42 may be more visible to the exterior. Best depicted in FIG. 2. In a suitable variation, the plurality of LED strobes 42 may be a xenon flash lamp, or any other LED variation known in the art. In a preferred embodiment, the plurality of LED strobes 42 may be multicolor and/or may produce a plurality of colors. In an exemplary embodiment, a button 44 may be placed on an aperture of the housing, wherein the button 44 may extend past from the housing. As shown in FIG. 2. In a preferred embodiment, the button 44 may be a slide switch, a rotary switch, a latch button, a toggle switch, or any other suitable variation. In one embodiment, integral receptor module 46 may be housed inside the housing 22, wherein the integral receptor module 46 may be operatively connected to an integral remote device 100. The integral remote device 100 may include a plurality of buttons, said plurality of buttons may actuate the plurality of LED strobes or a partiality thereof, wherein the plurality of buttons may actuate the plurality of LED strobes in a predetermined lighting sequence, thereby the user may actuate the plurality of LED 42 and/or by the button 44. It should be considered that the integral receptor module 46 may be an electronic element, a circuit board, or any other suitable variation. In other embodiment, the integral charging module 48 may be housed inside the housing 22, wherein the integral charging module 48 is operatively connected to the battery 54. It should be considered that the integral charging module 48 may be an electronic element, a circuit board, or any other suitable variation. In a suitable embodiment, the charging port 50 may be operatively connected to the integral charging module 48, wherein the charging port 50 may be housed inside the housing 22 and placed in an aperture of a rear side thereof, a portion of the charging port 50 may extend past from the housing 22. As best illustrated in FIG. 3. In a preferred embodiment, charging port 50 may be a 12-volt charging port well known in prior art, nonetheless, it should be considered that any other suitable charging port known in the art may be considered. In an exemplary embodiment, the charging indicator 52 may be integrated in the integral charging module 48, nonetheless, it should be considered that charging indicator 52 may be operatively connected to the integral charging module 48. The charging port 50 may include a plurality of light indicators wherein are actuated when an external power supply is connected to the charging port 50, thereby the charging indicator 52 provides a visual indication of the charging status of the battery 54. In one embodiment, the battery 54 may be housed inside the housing, wherein the battery 54 may power the integral charging module 48, thereby said battery 54 may supply power energy to the plurality of LED strobes 42. In a preferred embodiment, battery 54 may be a Lithium-Ion 12-volt rechargeable battery, nonetheless, it should be considered that any other battery known in prior art and/or a plurality of batteries connected therebetween, may be suitable to power the electronic assembly 40. In other embodiment, the terminal block 56 may be housed inside the housing 22, wherein the terminal block 56 connects the plurality of LED strobes 42 in a safe, reliable manner, thereby the power supply is operatively connected to the terminal block and interacting with the plurality of LED strobes 42 when the button 44 or the integral receptor module 46 are actuated. As shown in FIG. 4.

Figure 1:
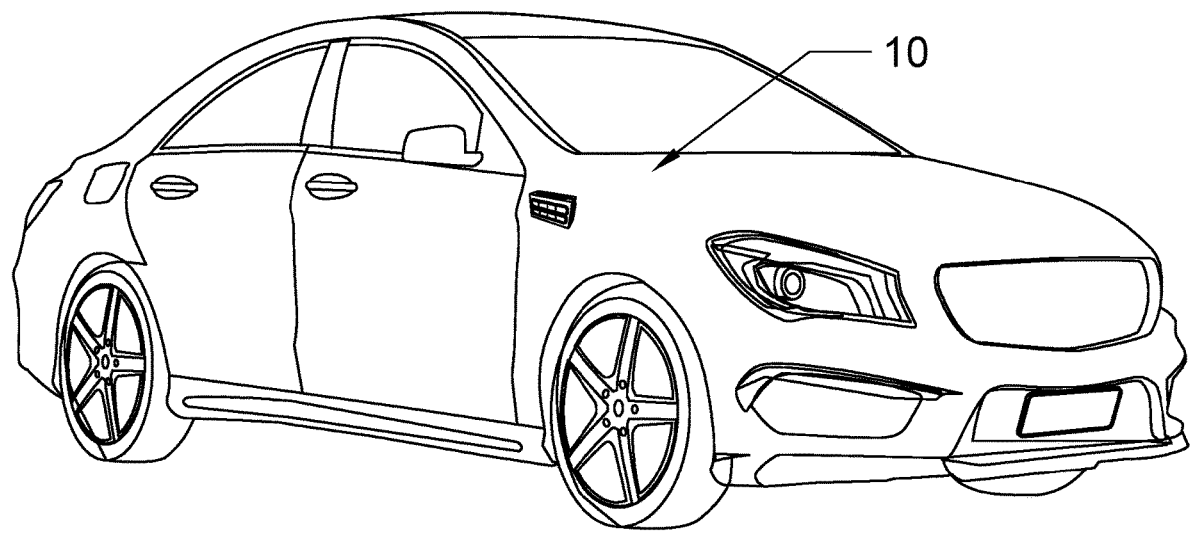
FIG. 1 represents an operational view on an exemplary embodiment of the present invention 10.

Attaching assembly 60 includes a magnet 62, win said magnet may be attached to a rear side of the housing 22. Best illustrated in FIG. 3. In an exemplary embodiment, the magnet 62 may be a magnet well known in the art, wherein the magnet 62 may have a circular shape, a square shape, a rectangular shape, a regular shape, an irregular shape, or any other suitable variation. In a preferred embodiment, the present invention may be removably attachable to an external side of an automobile by means of the magnet 62 providing an aid in the visibility for outcoming traffic. As shown in FIG. 1. It should be considered that the housing 22 when assembled with electronic assembly 40 may be waterproof, thereby the circuitry inside the housing 22 may be protected.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:
1. An automobile funeral light, comprising:
a housing assembly including a housing and a lid, wherein said housing has a cuboid shape, said housing has a hollow body, said lid is placed in a rear side of said housing, wherein the lid is attached to the housing by a hinge mechanism;
an electronic assembly having a plurality of LED strobes, a button, a charging port, and a battery, wherein said electronic assembly is housed inside of said housing, said plurality of LED strobes are powered by said battery, said plurality of LED strobes are actuated by said button, said battery is charged by means of said charging port, said button is a latch button located next to the plurality of LED strobes, wherein the charging port is housed inside the housing and placed in an aperture of the lid, wherein said LED strobes produces a white and a purple light wherein said electronic assembly further includes an integral receptor module, wherein said integral receptor module is operatively connected said plurality of LED strobes, wherein said electronic assembly further includes an integral charging module, wherein said integral charging module includes a charging indicator to show the charging status from said battery, wherein the charging indicator is a plurality of light indicators, wherein the plurality of LED strobes are located on a top side lateral sides and front side of the housing; and
an attaching assembly including a magnet, said magnet is attached on said housing.
2. The automobile funeral light of claim 1, wherein said housing has a plurality of sides with apertures thereon.
3. The automobile funeral light of claim 1, wherein said battery is a Lithium-Ion 12-volt rechargeable battery.
4. The automobile funeral light of claim 1, wherein said charging port is a 12-volt charging port.
5. The automobile funeral light of claim 1, wherein said integral remote device is operatively connected to said integral module receptor, wherein said integral remote device actuates said plurality of LED strobes.
6. An automobile funeral light, comprising:
a housing assembly including a housing and a lid, wherein said housing has a cuboid shape, said housing has a hollow body, and said housing further includes apertures on the sides, said lid is placed in a rear side of said housing, said lid is removably attachable to said housing by a hinge mechanism;
an electronic assembly having a plurality of LED strobes, a button, an integral receptor module, an integral charging module, a charging port, and a battery, wherein said electronic assembly is housed inside of said housing, a portion of said plurality of LED strobes extends past from said housing, said plurality of LED strobes are operatively connected to said integral receptor module, said integral receptor module is operatively connected to said integral charging module, wherein said integral charging module is powered by said battery, said button is a latch button, said button is operatively connected to said integral charging module, thereby said plurality of LED strobes are actuated by said button, said battery is charged by means of said charging port, said plurality of LED strobes is actuated by means of said button and/or an integral remote device wirelessly connected to the integral receptor module, wherein the plurality of LED strobes are located on a top side, lateral sides and front side of the housing, wherein the charging port is housed inside the housing and placed in an aperture of the lid, wherein the plurality of LED strobes are oriented coplanarly to a side of the housing; and
an attaching assembly including a magnet, said magnet is attached on a rear side of said housing.

7. An automobile funeral light, consisting of:

a housing assembly including a housing and a lid, wherein said housing has a cuboid shape, said housing has a hollow body, and said housing further includes apertures on the sides, said lid is placed in a rear side of said housing, said lid is removably attachable to said housing by means of fasteners;

an electronic assembly having a plurality of LED strobes, a button, an integral receptor module, an integral charging module, a charging port, a battery, a charging indicator, and a terminal block, said button is a latch button, wherein said electronic assembly is housed inside of said housing, a portion of said plurality of LED strobes extends past from said housing, said plurality of LED strobes are operatively connected to said terminal block, said terminal block is operatively connected to said integral receptor device, said integral receptor module is operatively connected to said integral charging module, wherein said integral charging module is powered by said battery, said button is operatively connected to said integral charging module, thereby said plurality of LED strobes are actuated by said button, said battery is charged by means of said charging port, wherein said charging indicator is operatively connected to said integral charging module, thereby said charging indicator represents the charging status of said battery by means of a plurality of lights integrated on said charging indicator while charging said battery, said plurality of LED strobes is actuated by means of said button and/or an integral remote device wirelessly connected to the integral receptor module, wherein said integral remote device includes a plurality of buttons that actuates said plurality of LED strobes and/or a partiality thereof, wherein the plurality of LED strobes are located on a top side, lateral sides and front side of the housing wherein the charging port is housed inside the housing and placed in an aperture of the lid; and an attaching assembly including a magnet, said magnet is attached on a rear side of said housing allowing said housing to be removably attachable to the exterior of an automobile.

* * * * *